United States Patent
Schmitz

(10) Patent No.: US 8,905,453 B2
(45) Date of Patent: Dec. 9, 2014

(54) INTERIOR VENTING

(71) Applicant: Dr. Ing. h.c. F. Porsche Aktiengesellschaft, Stuttgart (DE)

(72) Inventor: Stefan Schmitz, Stuttgart (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 14/068,281

(22) Filed: Oct. 31, 2013

(65) Prior Publication Data

US 2014/0117693 A1 May 1, 2014

(30) Foreign Application Priority Data

Oct. 31, 2012 (DE) .................. 10 2012 110 451

(51) Int. Cl.
*B60J 9/00* (2006.01)
*B60H 1/24* (2006.01)
*B60R 13/02* (2006.01)

(52) U.S. Cl.
CPC ................ *B60R 13/02* (2013.01); *B60H 1/244* (2013.01); *B60R 2013/0293* (2013.01)
USPC ........................................................ 296/1.08

(58) Field of Classification Search
USPC ............. 296/1.08, 1.01, 146.7, 214; 280/732, 280/728.3; 49/502
See application file for complete search history.

(56) References Cited

U.S. PATENT DOCUMENTS

| | | | | |
|---|---|---|---|---|
| 5,080,749 A * | 1/1992 | Moriya et al. | ................ | 156/382 |
| 5,116,280 A * | 5/1992 | Kloster | .......................... | 454/137 |
| 5,399,121 A * | 3/1995 | Gray et al. | ..................... | 454/137 |
| 6,135,874 A * | 10/2000 | Weber | ........................... | 454/124 |
| 6,685,261 B2 * | 2/2004 | Brancheriau et al. | .......... | 296/208 |
| 7,013,656 B2 * | 3/2006 | Yanagimachi et al. | .......... | 62/126 |
| 8,272,685 B2 * | 9/2012 | Lucas et al. | ................ | 297/180.1 |
| 8,480,461 B2 * | 7/2013 | Gruenberg | .................... | 454/152 |
| 2006/0102109 A1 * | 5/2006 | Becker et al. | ............... | 123/41.48 |
| 2008/0122275 A1 * | 5/2008 | Flory et al. | ................. | 297/230.1 |
| 2008/0128107 A1 * | 6/2008 | Yoshii et al. | ..................... | 165/42 |
| 2011/0074184 A1 * | 3/2011 | Hashikawa et al. | ........... | 296/208 |
| 2011/0162901 A1 * | 7/2011 | Lucas et al. | .................. | 180/68.2 |
| 2012/0104784 A1 * | 5/2012 | Sapak et al. | .................. | 296/1.08 |
| 2014/0060795 A1 * | 3/2014 | Yu | .................................. | 165/202 |

* cited by examiner

*Primary Examiner* — Kiran B Patel
(74) *Attorney, Agent, or Firm* — Gerald E. Hespos; Michael J. Porco; Matthew T. Hespos

(57) ABSTRACT

A motor vehicle has a structural component and a first and second interior trim part, which are butt jointed directly to one another in a butt jointing region. The two interior trim parts separate a passenger compartment interior from a venting space situated between the structural component and the interior trim parts. A section or sections of the first interior trim part in the butt jointing region has a concave arched profile facing the second interior trim part, thereby canceling the butt joint and forming an air duct between the passenger compartment interior and the venting space.

9 Claims, 2 Drawing Sheets

INTERIOR VENTING

CROSS REFERENCE TO RELATED APPLICATION

This application claims priority under 35 USC 119 to German Patent Appl. No. 10 2012 110 451.4 filed on Oct. 31, 2012, the entire disclosure of which is incorporated herein by reference.

BACKGROUND

1. Field of the Invention

The invention relates to a motor vehicle having a structural component and a first and second interior trim part.

2. Description of the Related Art

Interior trim parts are often butt jointed in a linear fashion to achieve an interior trim that is as visually pleasing and continuous as possible. However, the direct abutment of two interior trim parts in a butt jointing region also creates a flow-tight joint which represents an obstacle to efficient interior venting. Interior venting is absolutely essential to enhance convenience, especially when closing the vehicle doors.

For this reason, slots have been provided in individual interior trim parts on previous motor vehicles, but these disadvantageously prejudice interior design. Moreover, the function of the slots was comparatively easy for experienced end users to discern. As a result, the goal of accomplishing interior venting as discreetly as possible was not achieved. In addition, the end user could see into such slots, and could view surfaces and elements (e.g. painted bodyshell, cables, insulation etc.) that do not harmonize technically and/or in terms of color with the interior. Additionally, the purpose of the interior trim part normally is to cover completely, and an incomplete covering gives a loss of a sense of quality. Furthermore, such slots represent openings in the injection molding which disrupt flow. As a result, the seams that arise during production due to the openings additionally prejudice the mechanical and optical characteristics of the interior trim part. The phenomena associated with seams and the low section modulus produce webs between the individual slots that have little resistance to mechanical loads and can break relatively quickly, especially if they come into contact with luggage.

The slots also imprecisely guide the air since the air flow behind the slots is distributed locally in a diffuse manner and eddies that occur during this process reduce the efficiency of interior venting, rendering it necessary to make the slots even larger to compensate for this loss of efficiency. Moreover, such slots greatly restrict freedom in the design of the surfaces of the interior trim part because, in the absence of available laminating area, the potentially narrow webs between the individual slots can be covered with a decorative material only with a great deal of effort. Furthermore, the individual slots have to be cut free after the actual laminating process. This generally is performed manually and therefore is expensive and associated with a high process-related risk.

The invention therefore is concerned with a motor vehicle having a structural component and first and second interior trim parts that achieve effective interior venting without visual or other impairments.

SUMMARY OF THE INVENTION

The invention relates to a motor vehicle with an interior trim that has a first interior trim part with an arched profile that is concave, at least in a section or sections, in a butt jointing region with a second interior trim part. The arched profile cancels the direct butt joint between the two interior trim parts in this region and forms an air duct between a passenger compartment interior and a venting space, allowing problem-free venting of the passenger compartment interior, especially when vehicle doors are closed rapidly, but at the same time is visually pleasing and does not have any of the mechanical deficiencies or difficult production steps known in the prior art. The first and second interior trim parts described above directly abut in the butt jointing region and normally are connected to one another in an air- or flow-tight manner in this region. In this case, the two interior trim parts separate the passenger compartment interior from a venting space between the structural component and the interior trim parts. According to the invention, the first and second interior trim parts are no longer directly in abutment with one another in this region but, on the contrary, are arranged spaced apart. Thus, the arched profile cancels the actual butt joint in this region and forms an air duct between the passenger compartment interior and the venting space. The arched profile of the first interior trim part makes it possible to see in only with difficulty, if at all, and therefore there is no need to accept any design disadvantages of the kind known from the prior art. In addition, the concave arched profile does not represent a mechanical weakening, like the slots of the prior art. Therefore the venting function can be implemented without any mechanical impairment. It is furthermore of advantage that a directed air flow is enforced by the air duct and that it is not necessary to put up with a diffuse air flow that hinders effective venting of the interior.

The concave arched profile of the first interior trim part extends along a radius R around a free wall end of the second interior trim part and corresponds substantially to the lateral surface of a cylinder. It is thereby possible to achieve an air duct configuration That is particularly effective in terms of flow engineering, thereby enabling the duct to perform its actual venting function particularly well.

A holder extends through the air duct and holds the free wall end of the first interior trim part at a distance from the second interior trim part preferably is arranged on the second interior trim part. The holder has a length to project from the second interior trim part, extends through the air duct and fixes, at its free end, the free wall end of the first interior trim part. The length of the holder makes it possible to exert an influence on the free flow cross section of the air duct and on flow guidance by the free wall end of the first interior trim part. The free wall end of the first interior trim part can be fixed on the holder by a plug-type or latching connection or a clip, for example, and a material joint is of course also conceivable.

Further important features and advantages of the invention will become apparent from the drawings and from the associated description of the figures with reference to the drawings.

The features mentioned above and those explained below can be used in the respectively indicated combination and in other combinations or in isolation without exceeding the scope of the invention.

Preferred embodiments of the invention are illustrated in the drawings and are explained in greater detail in the following description, wherein the same reference signs refer to identical or similar or functionally identical components.

DETAILED DESCRIPTION OF THE PREFERRED EMBODIMENTS

Figure 1:
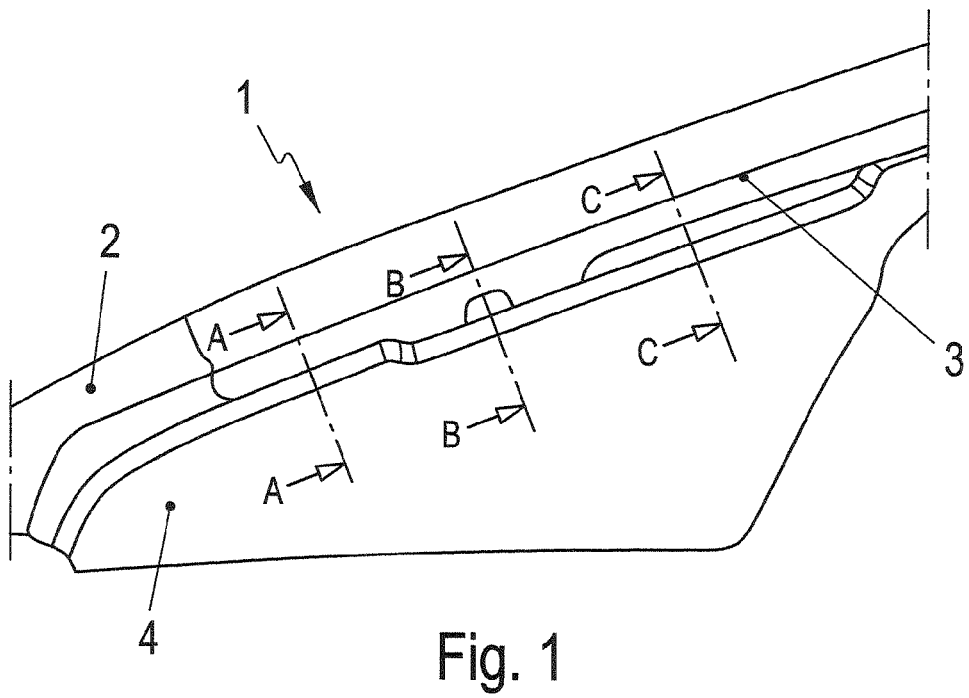
FIG. 1 is a view of a motor vehicle according to the invention in the region of a butt joint between a first interior trim part and a second interior trim part.

A motor vehicle 1 according to the invention is identified by the numeral 1 in FIGS. 1 to 4. The motor vehicle 1 has a structural component 2 and first and second interior trim parts 3 and 4 to line the structural component. The two interior trim parts 3, 4 are butt jointed directly to one another in a butt jointing region 5 and, in the process, are connected to one another in a flow-tight manner (cf. sectional view in FIG. 2). The two interior trim parts 3, 4 furthermore separate a passenger compartment interior 6 from a venting space 7 situated between the structural component 2 and the interior trim parts 3, 4. To allow rapid venting of the passenger compartment interior 6 in the direction of the venting space 7 when vehicle doors are being closed, at least one section of the first interior trim part 3 in the butt jointing region 5 has a concave arched profile 8 facing the second interior trim part 4 (cf. FIGS. 3 and 4), thereby canceling the butt joint and forming an air duct 9 between the passenger compartment interior 6 and the venting space 7. In this case, it is not normally possible to see into the air duct 9, but the duct 9 is highly efficient for venting the passenger compartment interior 6 and furthermore does not form any mechanical weaknesses, as was the case previously through the provision of slots, for example.

Of course, the arched profile 8 is provided only over a certain area, as illustrated in FIG. 1, and therefore the first interior trim part 3 is butt jointed to the second interior trim part 4 in a manner that is leak tight in terms of flow engineering in the remaining area.

Figure 3:
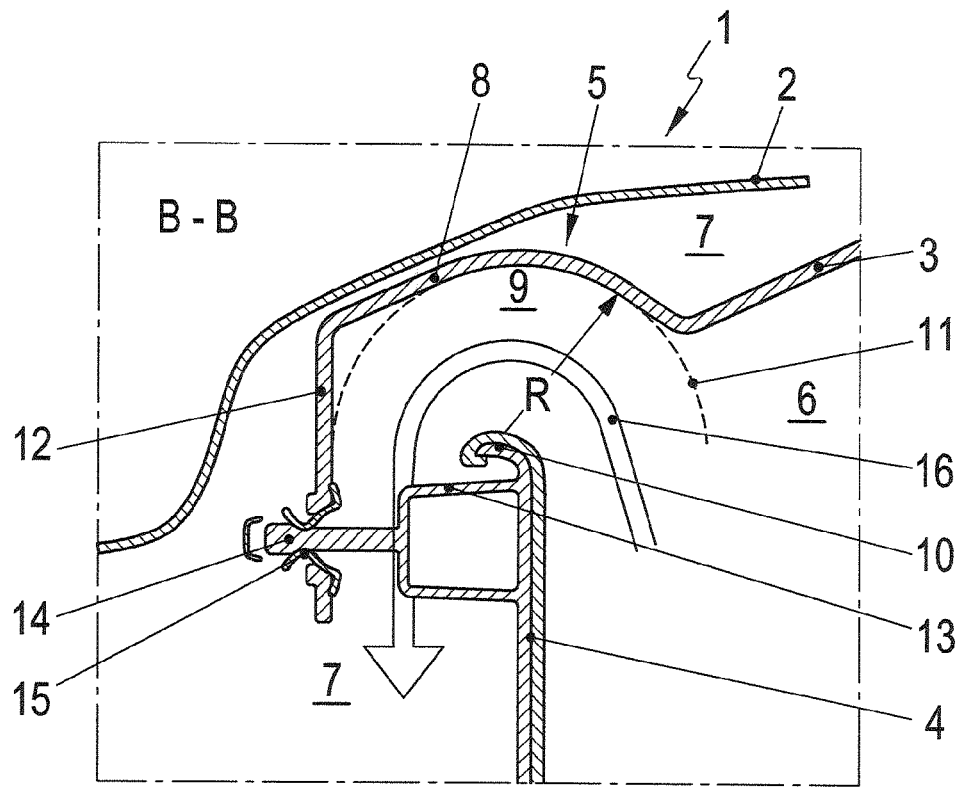
FIG. 3 is a section through the butt jointing region in section plane B-B.

As shown in FIG. 3, the concave arched profile 8 extends along a radius R around a free wall end 10 of the second interior trim part 4 and corresponds substantially to the lateral surface of a cylinder 11. The arched profile 8 of the first interior trim part 3 likewise has a free wall end 12 that extends tangentially to the radius R and substantially parallel to the second interior trim part 4.

Figure 2:
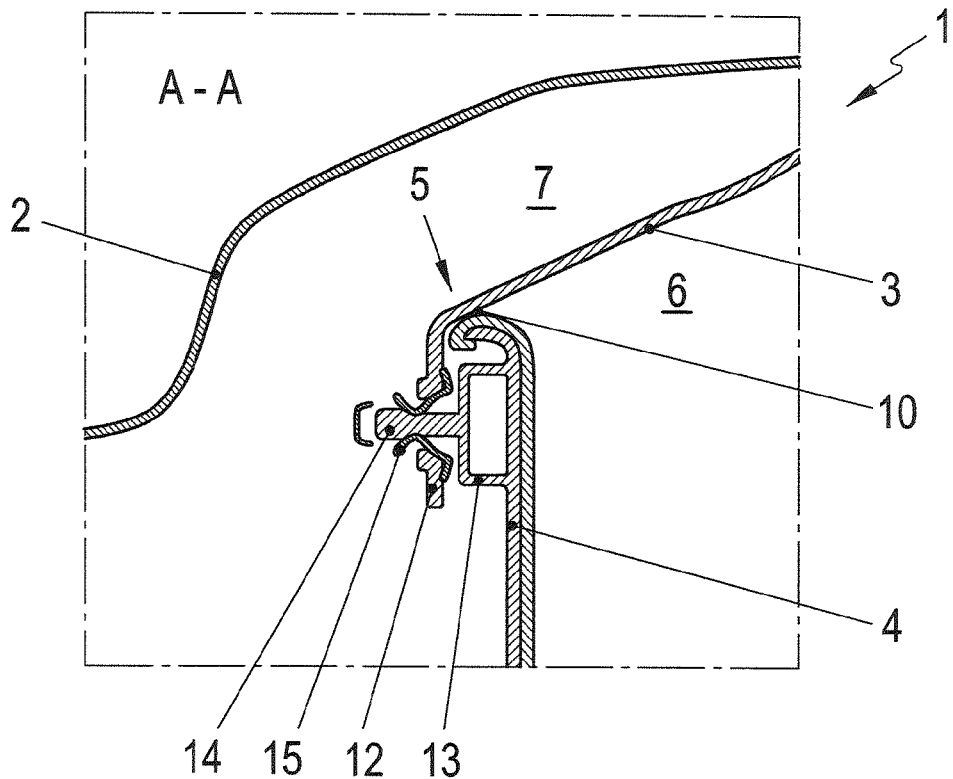
FIG. 2 is a section through the butt jointing region in section plane A-A.

As shown in FIGS. 2 and 3, a holder 13 is arranged on the second interior trim part 4 and extends through the air duct 9 to hold the free wall end 12 of the first interior trim part 3 at a distance from the second interior trim part 4. A projection 14 is arranged on the holder 13 and is fixed on the first interior trim part 3 by a clip 15. The length of the projection 14 is selected to determine a flow cross section of the air duct 9 and thereby directly to influence the venting effect.

Figure 4:
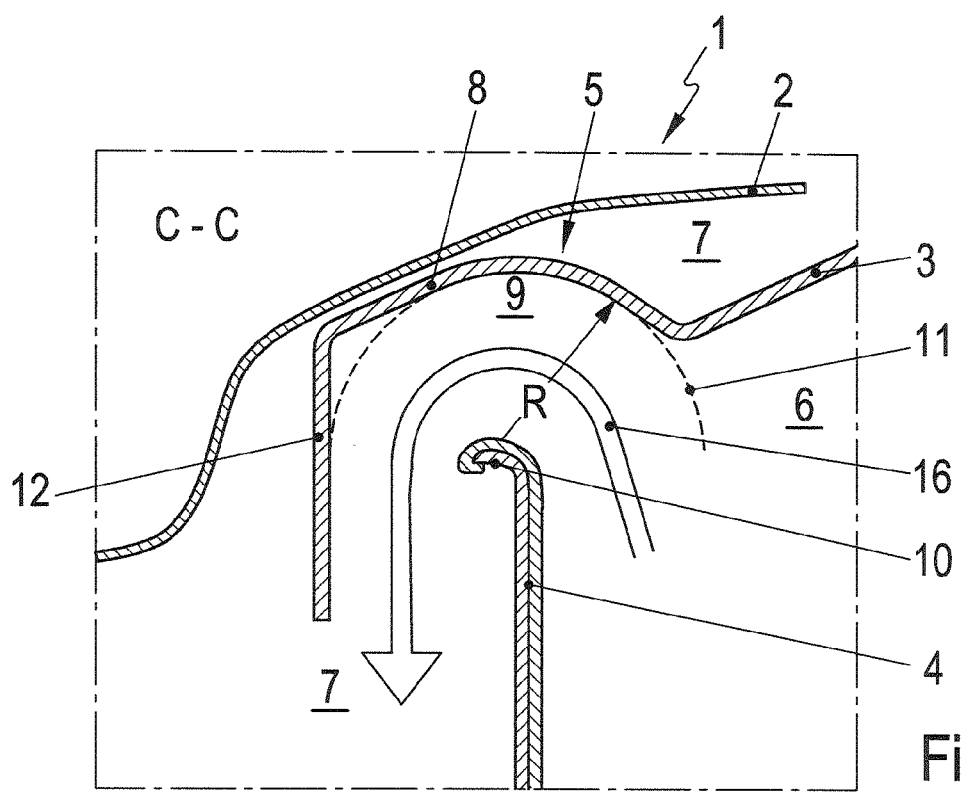
FIG. 4 is a section through the butt jointing region in section plane C-C.

As shown in FIGS. 2 to 4 the free wall end 10 of the second interior trim part 4 is angled in a manner that is favorable in terms of flow engineering in the direction of the air flow 16 flowing through the air duct 9 and therefore does not form an obstacle to flow. Of course, the connection between the holder 13 and the free wall end 12 of the first interior trim part 3 can also be implemented by a latching, clip or plug-type connection of some other kind, and can equally well be implemented by means of a material joint, e.g. by means of welding.

The narrow width of the holder 13 prejudices the flow behavior in the air duct 9 only marginally, if at all.

By means of the air duct 9 provided according to the invention, effective venting of the passenger compartment interior can be accomplished in a relatively simple manner since the air flow 16 is guided precisely into the venting space and is discharged from there into the environment.

By means of the first interior trim part 3 designed in accordance with the invention, the advantages listed below can be achieved.

There is no longer a need to provide any slots in individual interior trim parts, said slots impairing the visual design and mechanical stability, and therefore venting can be performed in a visually discreet manner, expensive lamination or finishing or repainting of the slots previously required is not necessary, the air flow is guided away precisely without reducing the efficiency of interior venting, as was previously the case with diffuse venting effected by means of slots, the venting function can be achieved in a manner that is simple in terms of production engineering, highly efficient and furthermore economical and mechanically stable.

What is claimed is:

1. A motor vehicle having a structural component and first and second interior trim parts butt jointed in a butt jointing region, the first and second interior trim parts separating a passenger compartment interior from a venting space between the structural component and the interior trim parts and at least one section of the first interior trim part in the butt jointing region having an arched profile facing the second interior trim part, thereby canceling the butt joint and forming an air duct between the passenger compartment interior and the venting space.

2. The motor vehicle of claim 1, wherein the arched profile extends along a radius around a free wall end of the second interior trim part and corresponds substantially to a lateral surface of a cylindrical body.

3. The motor vehicle of claim 2, wherein the arched profile (8) of the first interior trim part has a free wall end that extends tangentially to the radius.

4. The motor vehicle of claim 3, wherein the free wall end of the first interior trim part (3) extends parallel to the second interior trim part.

5. The motor vehicle of claim 3, further comprising a holder arranged on the second interior trim part and extending through the air duct, the holder holding the free wall end of the first interior trim part at a distance from the second interior trim part.

6. The motor vehicle of claim 3, further comprising a holder arranged on the first interior trim part and extending through the air duct and holding the free wall end of the second interior trim part at a distance from the first interior trim part.

7. The motor vehicle of claim 5, further comprising a projection arranged on the holder and fixed on the first or second interior trim part by a clip.

8. The motor vehicle of claim 5, wherein the holder is connected materially to the first interior trim part.

9. The motor vehicle of claim 1, wherein the butt jointing region is in a rear of the motor vehicle.

* * * * *